June 26, 1956     E. H. ZIEBOLD     2,752,172

RECTANGULAR BELLOWS AND METHOD OF MAKING SAME

Filed Aug. 1, 1952     6 Sheets-Sheet 1

INVENTOR
EUGENE H. ZIEBOLD

BY *Strauch, Nolan & Diggins*
ATTORNEYS

June 26, 1956 E. H. ZIEBOLD 2,752,172
RECTANGULAR BELLOWS AND METHOD OF MAKING SAME
Filed Aug. 1, 1952 6 Sheets-Sheet 2
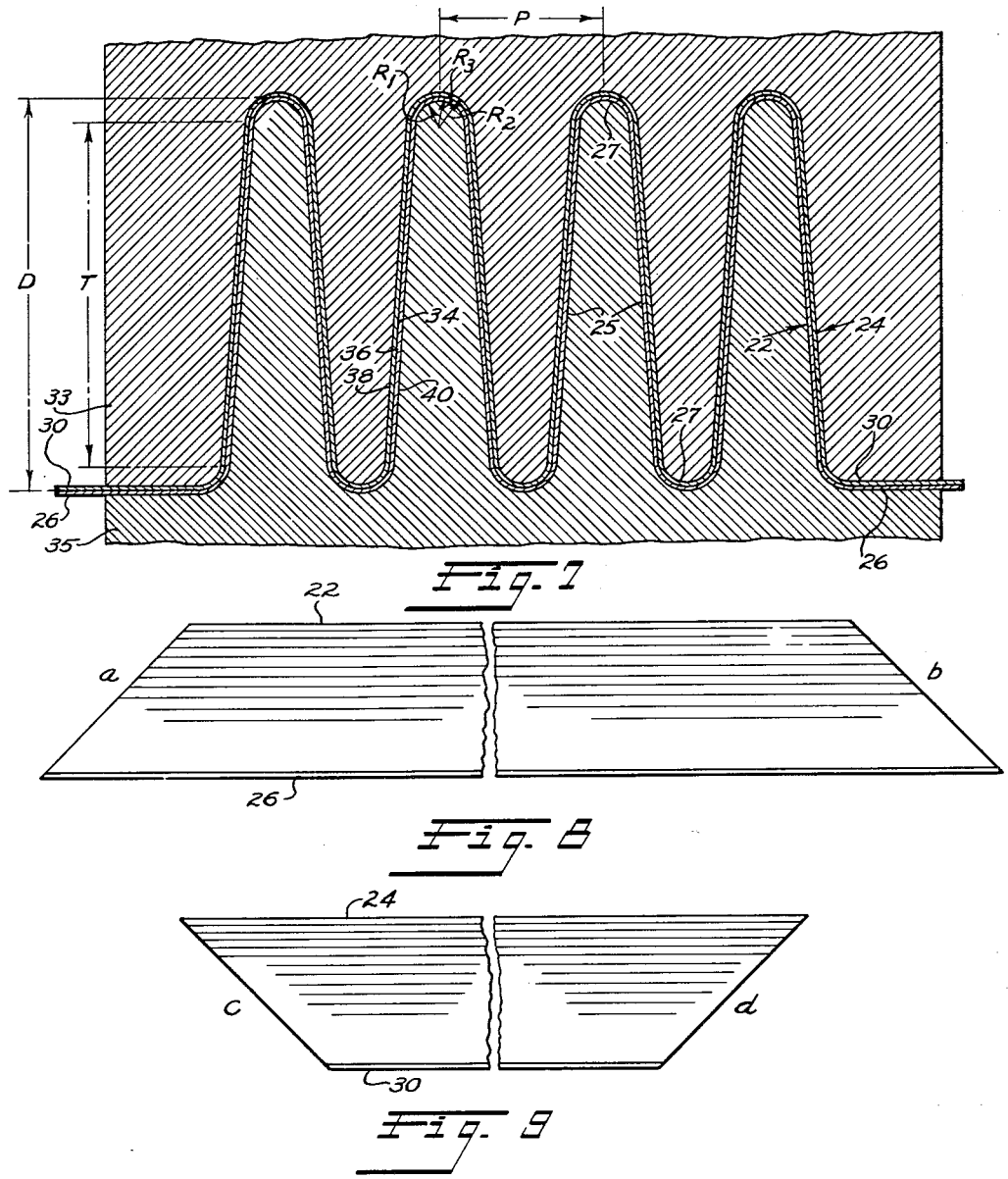
INVENTOR
EUGENE H. ZIEBOLD
BY Strauch, Nolan & Diggins
ATTORNEYS

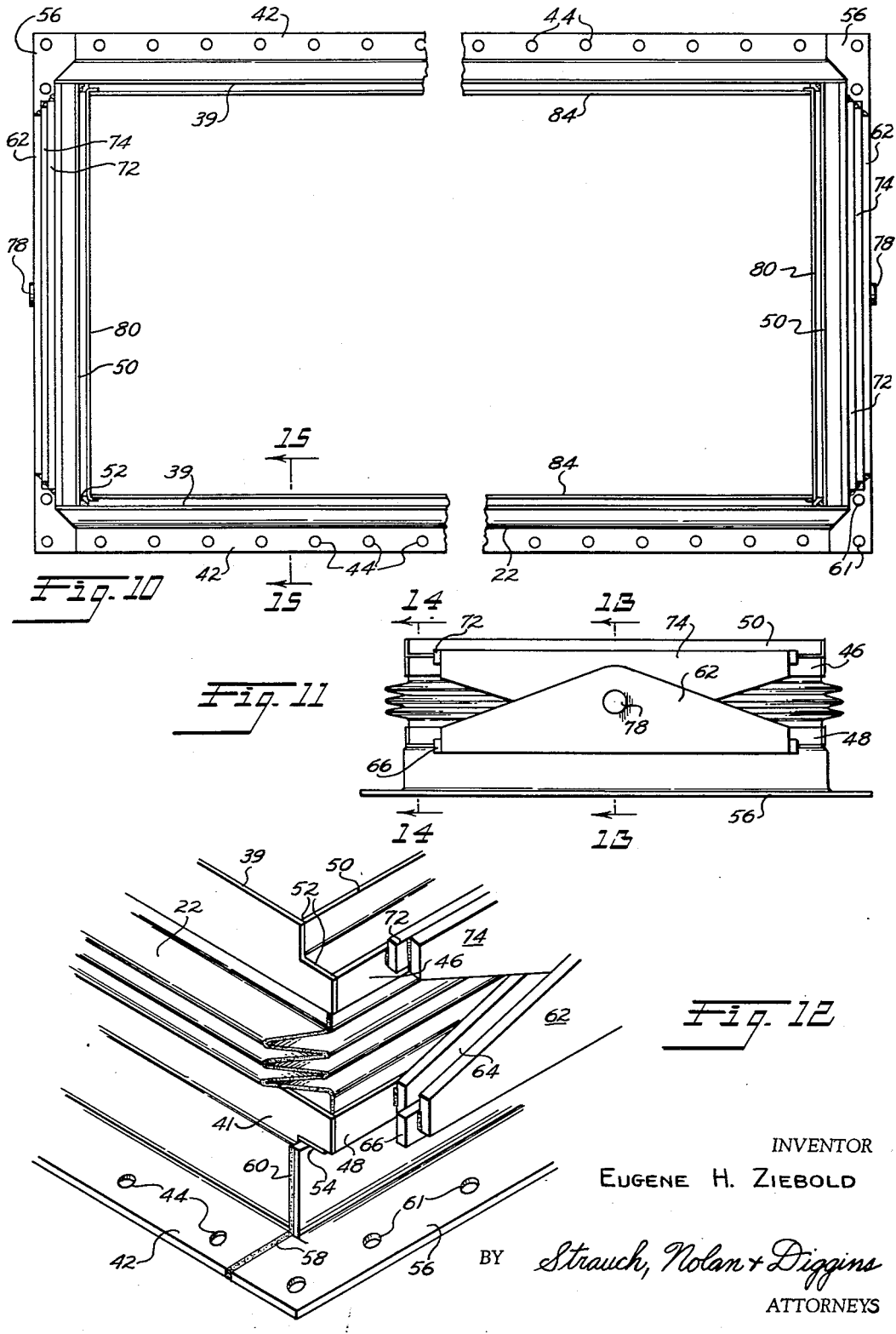

June 26, 1956  E. H. ZIEBOLD  2,752,172
RECTANGULAR BELLOWS AND METHOD OF MAKING SAME
Filed Aug. 1, 1952  6 Sheets-Sheet 4

INVENTOR
EUGENE H. ZIEBOLD
BY Strauch, Nolan & Diggins
ATTORNEYS

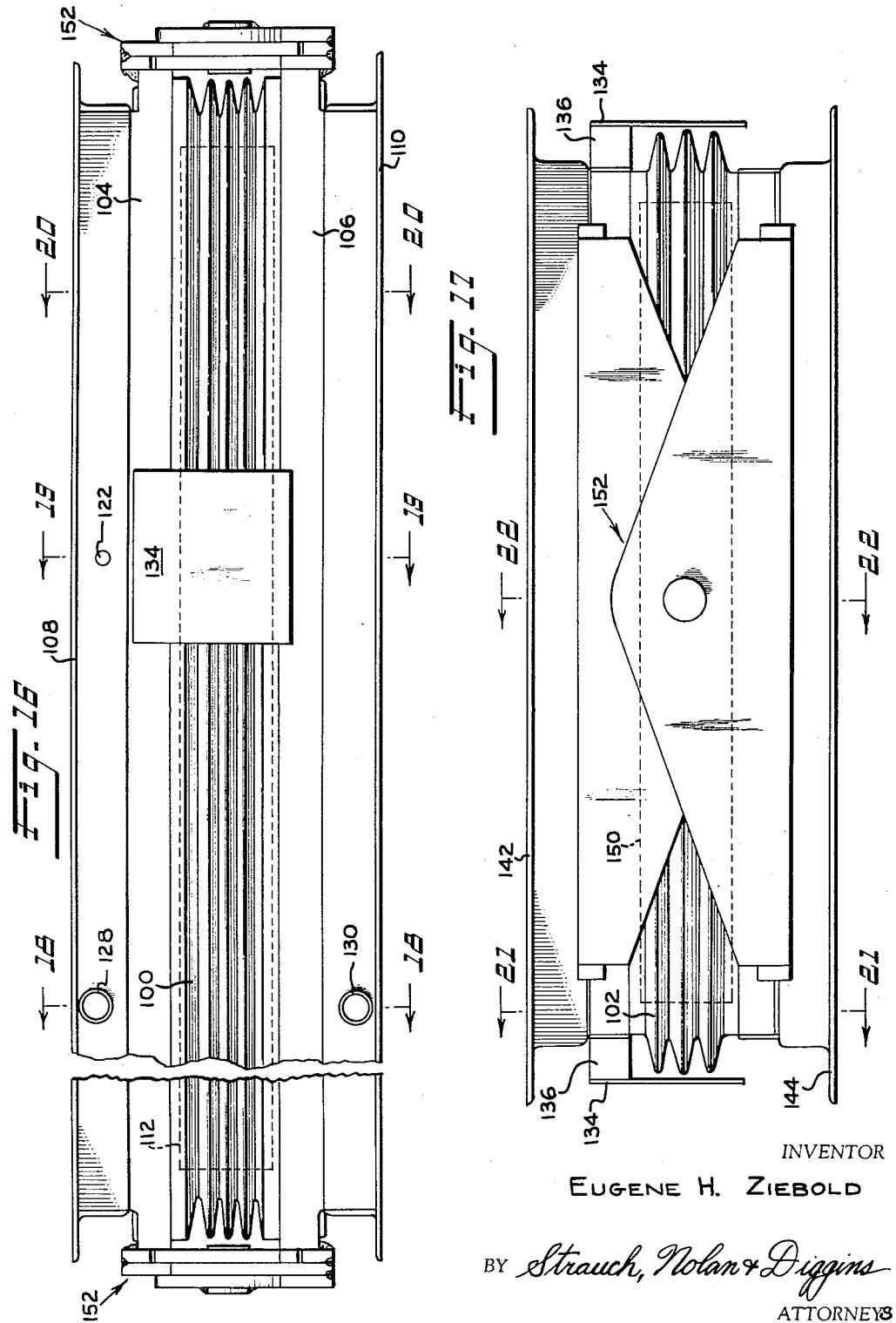

June 26, 1956 — E. H. ZIEBOLD — 2,752,172
RECTANGULAR BELLOWS AND METHOD OF MAKING SAME
Filed Aug. 1, 1952 — 6 Sheets-Sheet 6
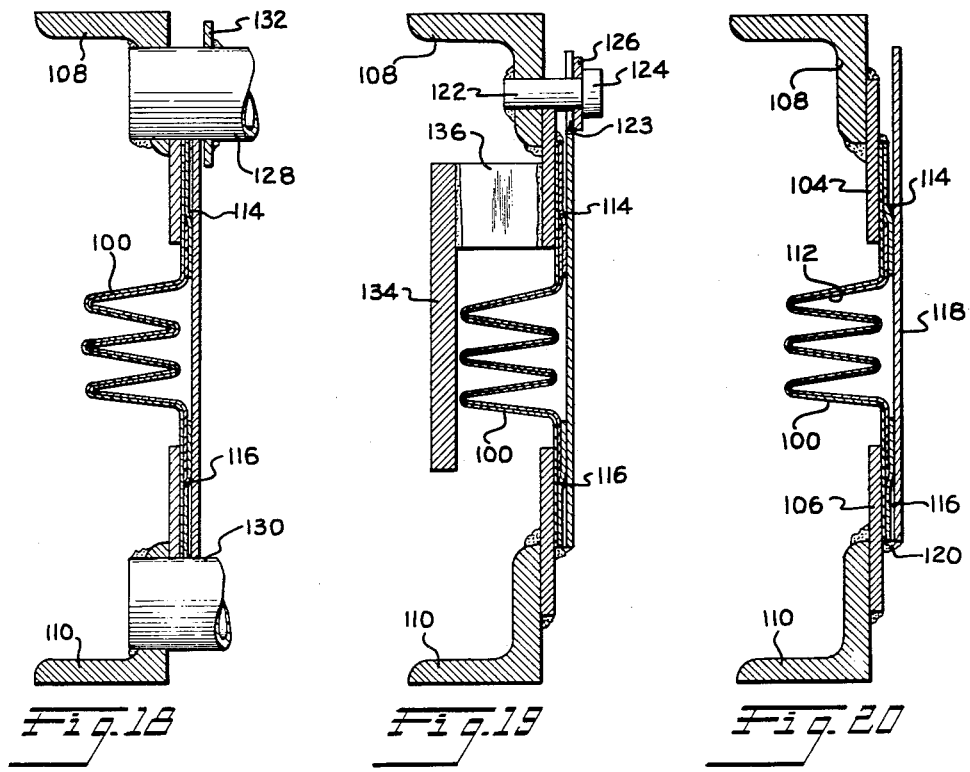
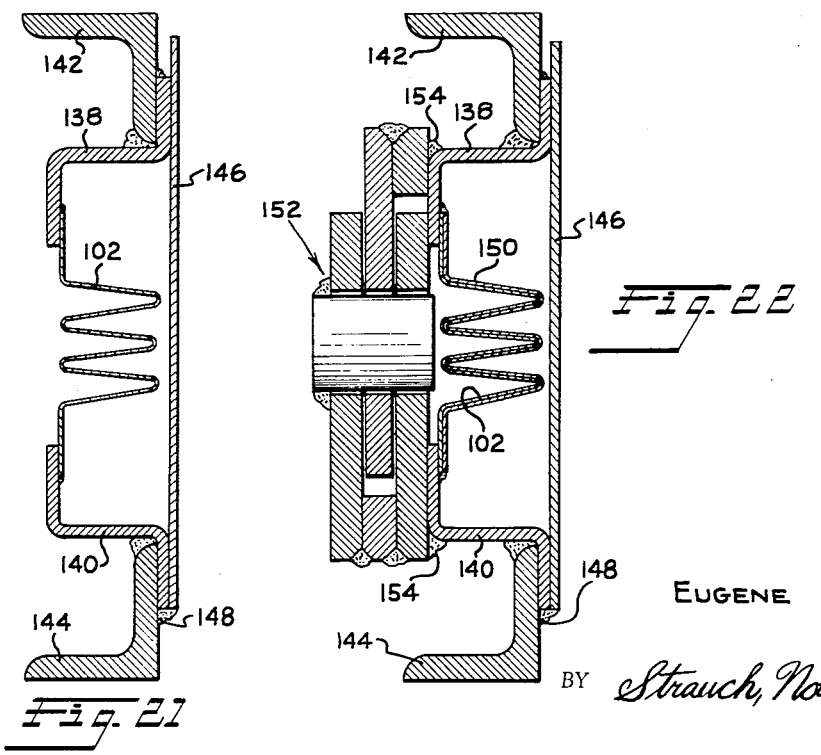
INVENTOR
EUGENE H. ZIEBOLD
BY Strauch, Nolan & Diggins
ATTORNEYS

United States Patent Office 2,752,172
Patented June 26, 1956

2,752,172

RECTANGULAR BELLOWS AND METHOD OF MAKING SAME

Eugene H. Ziebold, La Jolla, Calif., assignor to Solar Aircraft Company, San Diego, Calif., a corporation of California Application August 1, 1952, Serial No. 302,048

5 Claims. (Cl. 285—90)

This invention relates to flexible tubular members and more particularly to polyhedral expansion joints having a plurality of straight convoluted wall sections and to methods of their fabrication.

In the past, numerous efforts have been made to provide a flexible gas tight joint for uniting polyhedral ducts which are commonly square or rectangular. The difficulties involved in the fabrication of such a flexible joint having angularly related straight wall sections have been so formidable that the joints now in general use represent only unsatisfactory compromise solutions to the problem.

For example, it has been customary to quarter round bellows and insert straight convoluted walls between the arcuate quarter sections. Such a construction necessarily involves eight longitudinal welds along the convoluted surfaces which are extremely difficult to make and seriously interfere with the performance of the assembled flexible units. It has also been proposed to employ a round bellows as the main flexible unit with transition pieces connecting the round bellows to the straight sided ducts. The expense of transition pieces and the added length of the joint necessitated by their use has prevented general adoption of this expedient.

Various other methods have been proposed for fabricating square or rectangular bellows. A typical example of this form of construction may be found in United States patent to Heigh, Serial No. 1,944,128. The bellows disclosed in this patent, which is typical of the best prior developments, comprises separate corrugated side and end sections joined by four intricately folded corner sections. This construction again necessitates eight longitudinal welds along the corrugated surfaces of the joint, as well as welds at the mating flange sections which unduly increase the expense of the unit and seriously impair its efficiency. Further, in the Heigh structure, the metal of the corner pieces is folded back upon itself into extremely sharp corners. Flexure is concentrated in areas immediately adjacent the sharp corners, which, because of their double curvature, are stiffer than the other portions of the bellows. The incipient cracks inevitably formed from these concentrations of flexure stresses are aggravated by the work hardening and residual stresses resulting from the formation of the sharp bends in the metal, and this structure is not satisfactory.

In accordance with one aspect of the present invention, a polyhedral expansible unit is fabricated from pairs of opposed straight convoluted wall members joined at their edges along an externally accessible planar weld line with only a single, easily applied weld thus necessary at each corner.

It is accordingly the primary object of the present invention to provide a novel polyhedral expansible unit which may be readily fabricated with a significant reduction in expense over the prior art devices and which has an extended useful life.

It is also an object of the invention to provide a novel method for fabricating polyhedral expansible tubular units having greatly improved resistance to fatigue.

It is a further object to provide a novel polyhedral gas tight expansion joint capable of withstanding flexure of high amplitude and frequency over an extended period of time.

It is another object to provide a novel polyhedral expansion joint comprising separate convoluted straight wall sections joined by welding along an exposed planar line at each corner.

It is also an object to provide a novel polyhedral expansion joint having a minimum number of welds, which lie along exposed lines of substantially zero longitudinal shear and which may be easily and rapidly made with conventional techniques and which may be subsequently inspected and repaired at low cost.

It is a further object to provide a novel polyhedral expansion joint comprising pairs of opposed angularly related wall sections, the inner surface of one wall section being identical to the outer surface of an adjacent wall section whereby the corners between the walls are formed in perfect interleaving relation.

It is still another object to provide novel polyhedral expansion joints having complementary non-identical wall sections which may be formed simultaneously with a single set of dies with each wall section functioning as a die for the adjacent section thus assuring perfect fit in assembled relation.

It is an additional object to provide novel polyhedral expansion joints composed entirely of simple easily fabricated straight convoluted sections.

It is also an important object of the invention in another of its aspects to provide a novel polyhedral expansion joint which permits angular movement about one axis only.

It is another object to provide novel methods of joining pairs of convoluted wall sections to form a polyhedral expansion joint.

It is a further object of the invention to provide novel heat insulating means for expansion joints.

It is an additional object to provide novel means affording structural support for the convoluted walls of expansion joints to increase their resistance to deformation due to high internal pressure while maintaining the flexibility of the joint.

Further objects and advantages will become apparent as the description proceeds in connection with the appended claims and accompanying drawings in which:

Figure 7 illustrates diagrammatically a preliminary step in the fabrication of the convoluted wall sections of the joint of Figure 1;

Figures 8 and 9 illustrate, respectively, the completed side and end walls of the joint of Figure 1 prior to assembly;

Figure 10 is a top plan view of an expansion joint according to another embodiment of the invention;

Figure 11 is an end view of the expansion joint of Figure 10;

Figure 12 is an enlarged perspective view of a corner of the joint of Figure 10;

Figure 13:
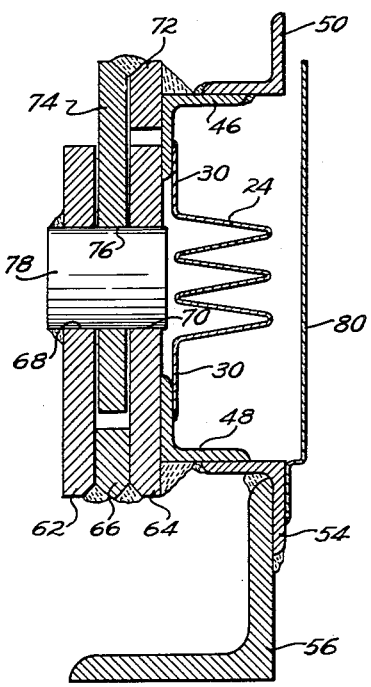
Figure 14:
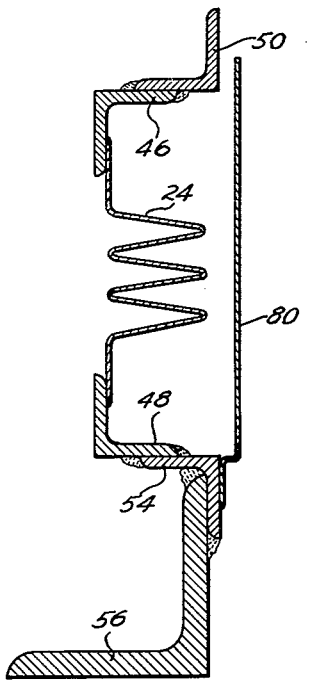
Figure 15:
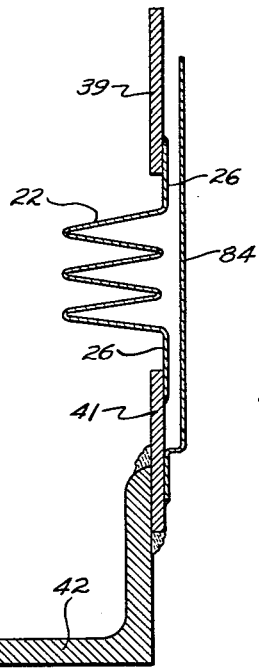

Figures 13 and 14 are fragmentary sectional views taken along lines 13—13 and 14—14, respectively, of Figure 11;

Figure 15 is a fragmentary sectional view taken along line 15—15 of Figure 10.

Figure 16 is a side elevation of an expansion joint according to another form of the invention.

Figure 17 is an end elevation of the joint of Figure 16.

Figures 18, 19, and 20 are fragmentary sectional views taken along lines 18—18, 19—19, and 20—20, respectively of Figure 16; and Figures 21 and 22 are similar views taken along lines 21—21 and 22—22 of Figure 17.

Figure 1:
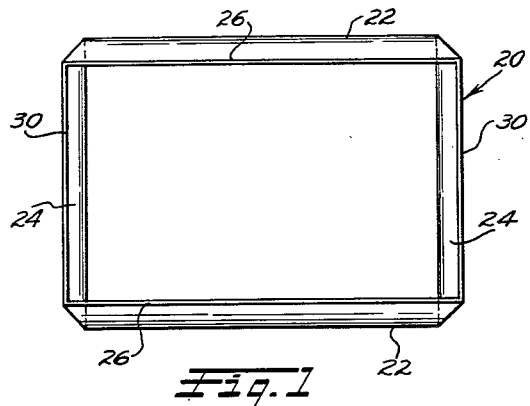
Figure 1 is a top plan view of an expansion joint according to one embodiment of the invention.
Figure 2:
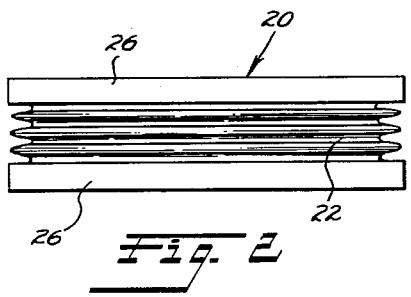
Figure 2 is a side elevation of the expansion joint of Figure 1.
Figure 5:
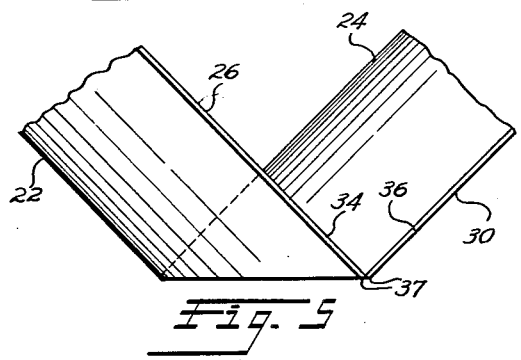
Figures 5 and 6 are top plan views of the structure of Figures 3 and 4 respectively.
Figure 3:
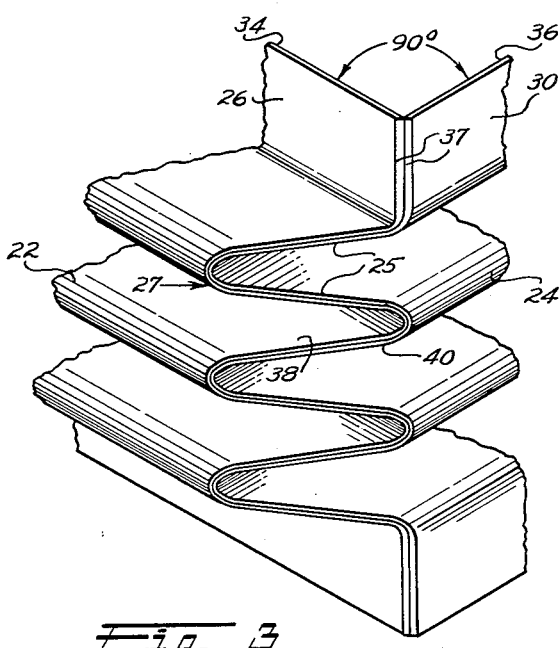
Figure 3 is an enlarged perspective view of a corner of the joint of Figure 1.

Referring now more particularly to the construction illustrated in Figures 1 to 9, the expansion joint indicated at 20 comprises pairs of opposed identical flexible side walls 22 and identical flexible end walls 24. As illustrated in Figure 3 each of the walls is straight in plan view and provided with a series of central corrugations preferably having substantially straight diverging sections 25 integrally joined by substantially circular sections 27.

Side walls 22 are provided at their opposite longitudinal edges with integral straight flange portions 26 which extend parallel to the axis of the assembled expansion joint. End walls 24 are provided with similar integral flange portions 30.

It is an important feature of the present invention that pairs of adjacent side walls 22 and end walls 24 are formed simultaneously on a single set of Yoder rolls or a single set of press brake dies 33 and 35 of suitable configuration.

Figure 7 illustrates a side wall and an end wall in the forming dies 33 and 35, after completion of the simultaneous forming operation. The convolutions of each of the walls as well as the flange portions lie in full surface contact. Thus the adjacent surfaces 34 and 36 of the side wall and the end wall, respectively, are identical in size and shape. The adjacent surfaces 34 and 36 thus function as complementary mutual die forming surfaces. The opposite surfaces 38 and 40 of the side and end walls, respectively, are similar in shape but differ from the identical surfaces by the metal thickness. Thus the exterior radii $R_1$ of the press brake die 35 or the forming rolls will be approximately equal to the common radius less the metal thickness. The internal radii $R_2$ of the rolls or forming die 33 will be approximately that of the common radius plus the metal thickness.

In a typical case, assuming a nominal metal thickness of .016", the remaining dimensions of the convolutions will be aproximately as follows:

| | Inches |
|---|---|
| Common radius, $R_3$ | .109 |
| External radius, $R_2$ | .125 |
| Internal radius, $R_1$ | .093 |
| Pitch, P | .625 |
| Depth, D | 1.50 |
| Common tangent, T | 1.11 |

After the simultaneously formed side and end wall pairs are removed from the forming rolls or dies, they are separated and cut at their opposite end edges along a plane at 45° to the longitudinal axis of the convolutions as indicated in Figures 8 and 9.

With reference to these figures it will be seen that the opposite end edges of the side wall 22 are cut on a plane which forms an acute included angle with the flanges 26. The edges of the end wall 24, on the other hand, are cut in a reverse direction, i. e., in a plane forming an obtuse included angle with respect to the flanges 30.

After the formed blanks have been cut as described above they are assembled with their longitudinal axes 90° apart to form a corner as illustrated in Figure 3 with either the edges $a$ and $c$ or $b$ and $d$ of the side and end walls, respectively, in contact. This manner of assembly disposes the identical surfaces 34 and 36 of the side and end walls respectively, toward each other in perfect interleaving relation at the corner of the joint with the peak of the convolutions of one wall lying in the valley of the convolutions in the adjacent wall as best illustrated in Figure 3.

It will be noted that with the walls so assembled, the flanges 30 of the end wall are disposed outwardly of the convolutions while the flanges 26 of the side walls are disposed inwardly of the convolutions.

Because of the 45° bevel along the edges of the walls and the disposition of the axes of the walls 90° apart, the identical surface edges including the beveled flanges are disposed in contact over their entire length and lie in a common externally facing plane tangent to the joint and inclined at an angle of 45° with respect to the longitudinal axis of both of the walls. The coplanar surfaces 37 of the contacting identical edges present a readily accessible surface which may be rapidly welded with conventional techniques and equipment. The nature of the forming operation assures that this relationship will be maintained despite any slight variation in the configuration of the adjoining walls since any variation in one wall must be accompanied by an identical variation in the adjacent wall.

The joint is completed by forming the opposite pair of walls in the manner previously described and welding the adjacent sides at the adjacent beveled corner edges. It is to be noted that only four single planar welds are necessary to form the complete gas tight joint as opposed to the eight or more irregular expensive welds common in the prior art.

While, by way of example, the convolutions have been illustrated having diverging straight walls, joined by substantially semi-circular curves it is to be understood that other conventional shapes may be employed. In each case, however, the slope of the sides of the convolutions should be sufficiently great so that in the most compressed position of the joint they will not become parallel, in which condition the innermost portions of the convolutions will press against each other where they cross in the corner of the joint.

Figure 6:
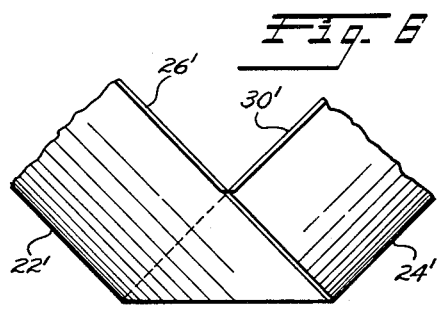
Figure 4:
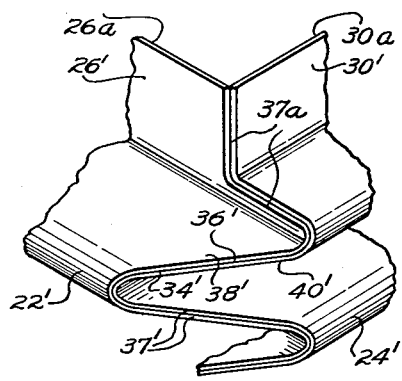
Figure 4 is a view similar to Figure 3, illustrating a further embodiment of the invention.

Figures 4 and 6 illustrate an expansion joint which is identical to that as shown in Figures 1 to 3 except that the flange portions 30' of the end wall sections have been subjected to an additional bending operation to dispose them inwardly of the convolutions so that the flanges on both the end and side wall sections will be aligned with the interior of the joint.

The walls of the modified joint are formed in a manner similar to that described above. However the flange 30' of the end walls is of extra width so that after the additional bending operation is accomplished in the flange, its upper edge 30a will be disposed in the plane of the edge 26a of the flange 26'. The irregular portion 37a of the contacting surfaces may be cut to fit normally.

It will be understood that conventional attaching structure may be applied to the ends of the above-described expansible units to adapt them for use with a variety of ducts.

It is often desirable that ducts be connected by a flexible joint so as to maintain the ends of the duct in predetermined spaced relation and in predetermined axial alignment about one axis and yet have free angular movement with respect to one another about another axis.

To this end the present invention provides the joint illustrated in Figures 10 to 15. This joint incorporates the bellows illustrated in Figure 1 to which attaching flanges and a pivot construction are added to provide the desired movement between the adjoining duct sections.

As best shown in Figures 12 and 15 the upper and lower flanges 26 of the side walls 22 are attached as by welding to identical relatively heavy stiffening members 39 and 41 which extend substantially along the entire length of the joint. The member 41 is welded to a heavy longitudinally extending base member 42 which is provided on its horizontal portion with a series of attaching holes 44. The opposite side of the bellows is of identical construction.

As shown particularly in Figures 11 to 14, the upper and lower flanges 30 of the end walls 24 are welded to rigid angle irons 46 and 48, respectively, which extend across the end of the joint and are welded at their opposite ends to the members 39 and 41. An angle iron 50 is welded to the upper horizontal surface of the member 46 and extends across the end of the bellows to the side stiffeners 39 to which it is welded as at 52 (Figure 12). The members 39 and 50 thus provide a rigid rectangular upper attaching surface for the joint.

A lower angle iron 54 is secured to the lower horizontal surface of member 48 and is welded at its opposite ends to the side members 41 and 42.

A base member 56 of the same height and width as the side members 42 is welded to the member 54 and as best shown in Figure 12 extends through a notch in the member 41 with its vertical and horizontal portions in flush engagement with the corresponding portions of the ends of the side members 42 to which it is welded as at 58 and 60. Attaching holes 61 are provided in the horizontal flange portion of the base member 56.

A pair of identical hinge plates 62 and 64 are secured along their lower edge to a spacer bar 66 with bores 68 and 70 in the plates 62 and 64, respectively, in axial alignment. The inner hinge plate 64 is welded to the angle iron 48 so as to dispose the bores 68 and 70 at the geometric center of the end of the bellows. A spacer bar 72 is secured to the angle iron 46 and supports an upper hinge plate 74 which extends downwardly between the plates 62 and 64 with a bore 76 therein in alignment with the bores 68 and 70. The end assembly is completed by a hinge pin 78 which extends through aligned bores 68, 76 and 70 and is welded to the outer plate 62. It will be understood that an identical pivot construction assembly is provided at the opposite end of the bellows.

By virtue of this construction an extremely rigid frame is provided for the bellows which maintains the mid-point of the upper and lower ends of the joint in predetermined spaced relation, permits free movement about the major axis of the joint and locks the joint against movement about its minor axis.

The joint of Figures 10 to 15 is preferably installed for use so that the fluid flow through the joint is from bottom to top. To minimize friction loss and impedance to flow caused by travel of the fluid over the convolutions of the joint, a thin sheet metal liner may be provided within the joint. The liner preferably comprises identical end sections 80 secured to the members 54 and identical side sections 84 secured to the members 41. As shown in Figure 10, the sections 80 are bent around the ends of the sections 84 to form a smooth rectangular enclosed channel to guide the fluid through the joint.

The liner sections are each offset inwardly from the members to which they are attached to provide a substantial clearance between them and the convolutions and the upper movable end of the bellows.

The expansion joint illustrated in Figures 16 through 22 is basically the same as that disclosed in Figures 10 through 15. However, the former incorporates several novel features which render the expansion joint particularly useful for large installations which require additional strength and resistance to heat loss.

The side and end convoluted wall sections 100 and 102, respectively, are identical with the corresponding sections 22 and 24 of the above described expansion joint. The upper and lower longitudinal edges of the convoluted side wall members 100 are secured to upper and lower stiffening members 104 and 106, the latter being secured in turn to upper and lower angle irons 108 and 110 for attachment to similar end fixtures in the conduit in which the expansion joint is to be installed. In order to strengthen the convoluted side wall 100, an inner wall section 112 is provided, the outer surface of which has exactly the same configuration as the inner surface of the wall 100. However, the inner wall section 112 is shorter than the main wall member 100, as seen in Figure 16, to avoid interference with the flexing at the corners of the expansion joint. The inner wall section 112 is held in place by upper and lower attaching members 114 and 116 which are preferably of the same length as the inner wall 112. The attaching members 114 and 116 are secured, preferably by welding, to the outer wall member 112 and the upper and lower stiffening members 104 and 106, the inner wall member 112 being received between off-set portions of the attaching members 114 and 116 and the outer wall member 100.

An inner liner 118, similar to the liner 84, is attached to the interior of the joint as by the weld 120. To prevent excessive vibration of the liner 118, one or more studs 122 are provided with extend through and are secured to the upper angle irons 108. The studs project inwardly through cut-out portions 123 of the liner 118 and have enlarged inner heads 124 which hold washers 126, of larger diameter than the cut-out portions, against the area of the liner 118 surrounding the cut-out portions.

The entire expansion joint is reinforced against excessive lateral spreading by means of one or more sets of upper and lower tubular members 128 and 130, the opposite ends of which extend through and are welded, respectively, to the upper and lower angle irons. The upper tubular members may be provided with washers 132 which are disposed closely adjacent the inner surface of the liner 118 to prevent vibration or undue flexing of the latter.

It has been found that where the expansion unit is extremely long, for example eight or ten feet or more it is desirable to provide further protection for the long unsupported lengths of the bellows wall against surging or possible blow-out.

To provide this additional protection, where necessary, the invention contemplates the utilization of relatively heavy plates 134 which, as shown particularly in Figure 19, are positioned vertically just outwardly of the outward ends of the wall members 100. If more than one such plate is employed, the plates will preferably be equally spaced along the length of the joint. The plates are rigidly secured in place by means of one or more webs 136 which are welded or otherwise suitably secured to one of the stiffening members 104 or 106.

Referring now more particularly to Figures 21 and 22 illustrating in section the construction of the end wall of the expansilon joint, the convoluted end walls 102 are secured along their upper and lower edges to upper and lower Z-shaped stiffening members 138 and 140, respectively, which are in turn secured to upper and lower angle irons 142 and 144, the horizontal surfaces of which are flush with the horizontal surfaces of the side angle irons 108 and 110. The liner section 146, corresponding to the previously described liner section 80, is secured to the inner surface of stiffening member 140 and to the lower angle iron 144 as by a weld 148.

It will be seen from Figure 22 that a double walled construction is employed in the end of the expansion unit similar to that employed in the side walls. For this purpose an inner wall section 150 is employed, the outer surface of which corresponds exactly to the inner surface of the end wall member 102 to permit the utilization of the joint for the handling of high pressure fluids. The inner wall section is preferably considerably shorter than the main wall section 102 to avoid interference with the flexure at the corner of the joint.

The pivot construction indicated generally at 152, which corresponds exactly to the construction shown and described in connection with the expansion joint of Figures 10 through 15 is secured to the upper and lower members 138 and 140 by welds 154. This pivot assembly will function to provide the same type of support against undue surging, vibration and blow-out as that afforded by the side plates 134.

It has been found that in addition to the reinforcing effect of the double wall construction, the heat loss due to radiation and conduction is materially reduced resulting in increased efficiency of the apparatus. Also by the utilization of the presently disclosed double wall construction the additional strength and reduction of heat loss may be effected without a deleterious effect on the flexing at the end corners of the expansion joint, a condition which would be inevitably produced if a single piece of heavier gauge material were substituted for the side and end wall members 100 and 102.

Thus it will be seen that the expansion joint disclosed in Figures 16 through 22 satisfies the most rigorous service requirements since the flexible portions of the joint are protected against surging and the entire assembly is rigidly supported by the tubular bracing members 128 and 130. At the same time because of the relatively thin gauge of the material employed at the corners of the unit a degree of flexibility is retained in the unit which is far beyond that which is ordinarily encountered in joints which may be used to handle fluids at comparable temperatures and pressures.

The novel expansion joint of the present invention, in any of its forms, requires only a minimum of special forming equipment since all of the bending of the sides is in a single plane. The complex double curvature forming problems associated with the corner construction of the prior art are entirely eliminated in the present construction. Further, the welding of the bellows elements is greatly simplified since it is confined to the four exposed corners which are formed so that the edges to be welded are perfectly matched and are readily accessible. The difficult and time consuming welding within the deep convolutions required by the prior art is entirely eliminated with a significant decrease in the expense of fabricating the unit.

For purposes of illustration, the expansion joints of the present invention have been described and illustrated as a four-sided rectangular or square joint. However, the novel method herein disclosed has equal application to the fabrication of any polyhedral expansion joint having an even number of sides. For example, a six-sided expansion joint may be formed by fabricating three pairs of adjacent bellows elements instead of the two pairs described above. The corners may be joined substantially as described above by beveling the corners at an angle of 30° rather than 45° as required in the four-sided figure. By slight deformation of the matching convoluted wall sections the ends may be joined by six readily accessible external planar welds.

This invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

This application is a continuation-in-part of application Serial No. 222,418 filed April 23, 1951, now abandoned.

What is claimed and desired to be secured by the United States Letters Patent is:

1. In a method of fabricating a polyhedral expansion joint, the steps of placing a pair of blanks in full surface contact, forming a series of convolutions simultaneously in said contacting blanks, beveling the end edges of said convoluted blanks, erecting said blanks with the identical surfaces in contact at the beveled edges, and securing said blanks together along their contacting beveled edges to form a corner of the joint.

2. In a method of fabricating a polyhedral expansion joint, the steps of forming a convoluted surface on a first blank, forming a substantially identical convoluted surface on a second blank, beveling the end edges of said blanks so that the ends of the convolutions are disposed in a plane inclined with respect to the axis of said convolutions, erecting said blanks with their beveled edges disposed in a common plane and the substantially identical surfaces in contact along the beveled edges, and securing said blanks tobgether at their contacting co-planar beveled edges to form a corner of the joint.

3. In a method of fabricating a polyhedral expansion joint, the steps of forming a convoluted surface on a first blank, forming a substantially identical surface on a second blank, beveling the edges of said blanks, and erecting said blanks with a portion of their substantially identical surfaces in contact and the beveled edges disposed in a common plane generating equal acute external angles with the axes of the convolutions of the erected blanks and securing said blanks together at said beveled edges to form a corner of the joint.

4. An expansion joint having an even number of angularly related walls including a first convoluted section forming one wall, a second convoluted section forming an adjacent wall, means securing said sections together with a portion of their end edges in line contact, and separate inner convoluted sections disposed in full surface contact along their lengths, respectively, with said first and second convoluted sections.

5. An expansion joint comprising a plurality of longitudinally convoluted angularly related walls having adjacent ends secured together to form the corners of the joint, the adjacent walls contacting each other substantially only along a single continuous line lying in a plane generating equal external acute angles with the axes of the convolutions of said adjacent walls, and separate inner convoluted wall sections in full surface contact with said angularly related walls along the length of said inner wall sections, said inner convoluted sections being of shorter length than said walls and having their ends spaced inwardly from the ends of said walls whereby said corners of the joint are of single thickness.

References Cited in the file of this patent

UNITED STATES PATENTS

| | | |
|---|---|---|
| 390,240 | Legat | Oct. 2, 1888 |
| 1,056,865 | Webster | Mar. 25, 1913 |
| 1,871,627 | Massa | Aug. 16, 1932 |
| 1,889,795 | Smith | Dec. 6, 1932 |
| 1,944,128 | Heigh | Jan. 16, 1934 |
| 2,363,828 | Andersonn | Nov. 28, 1944 |
| 2,467,867 | Somerville | Apr. 19, 1949 |
| 2,590,392 | Feilden | Mar. 24, 1952 |

FOREIGN PATENTS

| | | |
|---|---|---|
| 417,052 | France | Nov. 5, 1910 |